US010380826B2

(12) United States Patent
Cho et al.

(10) Patent No.: US 10,380,826 B2
(45) Date of Patent: Aug. 13, 2019

(54) SYSTEMS AND METHODS FOR UNLOCKING USER INTERFACE ELEMENTS

(71) Applicant: Disney Enterprises, Inc., Burbank, CA (US)

(72) Inventors: Joseph Cho, Toluca Lake, CA (US); Christopher Heatherly, Monrovia, CA (US); Matthew Danner, Los Angeles, CA (US); Patrick Sager, Los Angeles, CA (US); Alif Khalfan, Redwood City, CA (US); Bojan Jovanovic, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 132 days.

(21) Appl. No.: 15/331,720

(22) Filed: Oct. 21, 2016

(65) Prior Publication Data

US 2018/0114398 A1    Apr. 26, 2018

(51) Int. Cl.
*G07F 17/32* (2006.01)
*A63F 13/2145* (2014.01)
(Continued)

(52) U.S. Cl.
CPC ...... *G07F 17/3209* (2013.01); *A63F 13/2145* (2014.09); *A63F 13/42* (2014.09);
(Continued)

(58) Field of Classification Search
CPC .... G06F 3/0488; G07F 17/3209; G07F 17/32; G07F 17/3244; A63F 13/69;
(Continued)

(56) References Cited

U.S. PATENT DOCUMENTS 8,968,077 B2    3/2015    Weber
2015/0045110 A1    2/2015    Lempel
(Continued)

OTHER PUBLICATIONS

Author Unknown. *Unlock All 16 Snapchat Trophies in Snapchat Trophy Case*, http://appamatix.com. Tech Makai, LLC, Oct. 2015. Apr. 27, 2016. pp. 1-11.

(Continued)

*Primary Examiner* — David Duffy
*Assistant Examiner* — Ankit B Doshi
(74) *Attorney, Agent, or Firm* — Farjami & Farjami LLP

(57) ABSTRACT

There is provided a system comprising a touch screen display, a non-transitory memory storing a user interface, one or more software applications, and a game application, and a hardware processor executing the game application to launch a game for playing by the user using the touch screen display, receive a game play input from the user, while playing the game using the touch screen display, unlock a locked game element of a plurality of locked game elements of the game, in response to the game play input by the user, and add one of a plurality of user interface elements corresponding to the unlocked game element for display by the user interface, in response to the unlocking, wherein each of the plurality of locked game elements corresponds to one of the plurality of user interface elements, and wherein the user interface is used by the one or more software applications.

20 Claims, 4 Drawing Sheets

(51) Int. Cl.
*A63F 13/42* (2014.01)
*H04L 12/58* (2006.01)
*G06F 3/0488* (2013.01)
*G06Q 50/00* (2012.01)
*G06K 9/00* (2006.01)
*H04N 5/77* (2006.01)

(52) U.S. Cl.
CPC .......... *G07F 17/32* (2013.01); *G07F 17/3244* (2013.01); *G06F 3/0488* (2013.01); *G06K 9/00315* (2013.01); *G06Q 50/01* (2013.01); *H04L 51/32* (2013.01); *H04N 5/772* (2013.01)

(58) Field of Classification Search
CPC . A63F 13/2145; A63F 13/42; G06K 9/00315; G06Q 50/01; H04L 51/32; H04N 5/772
See application file for complete search history.

(56) References Cited

U.S. PATENT DOCUMENTS

| | | | |
|---|---|---|---|
| 2015/0277686 A1 | 10/2015 | Laforge | |
| 2016/0048286 A1* | 2/2016 | Picon | G06F 3/0488 463/33 |
| 2016/0196585 A1* | 7/2016 | Song | G06Q 30/0267 705/14.64 |
| 2017/0093777 A1* | 3/2017 | Neustifter | H04L 51/16 |
| 2018/0367483 A1* | 12/2018 | Rodriguez | H04L 51/046 |
| 2018/0367484 A1* | 12/2018 | Rodriguez | H04L 51/063 |

OTHER PUBLICATIONS

Author Unknown. *Big Emoji Keyboard—Stickers for Messages, Texting & Facebook on the App Store*, https//itunes.apple.com. Apple Inc, 2016. Apr. 27, 2016. pp. 1-3.

* cited by examiner

US 10,380,826 B2

SYSTEMS AND METHODS FOR UNLOCKING USER INTERFACE ELEMENTS

BACKGROUND

Modern mobile devices typically include a user interface that is used to compose and send text messages, picture messages, email messages, etc. Recent advances in mobile devices and mobile applications provide extensions to user interfaces, such as extension keyboards for including different and unique characters and/or images in messages composed using the extension user interface. Such extension keyboards are typically sold in app stores associated with a mobile device or the operating system running on the mobile device. Many extension keyboards have additional user interface elements that are available for purchase.

SUMMARY

The present disclosure is directed to systems and methods for unlocking user interface elements, substantially as shown in and/or described in connection with at least one of the figures, as set forth more completely in the claims.

DETAILED DESCRIPTION

Figure 1:
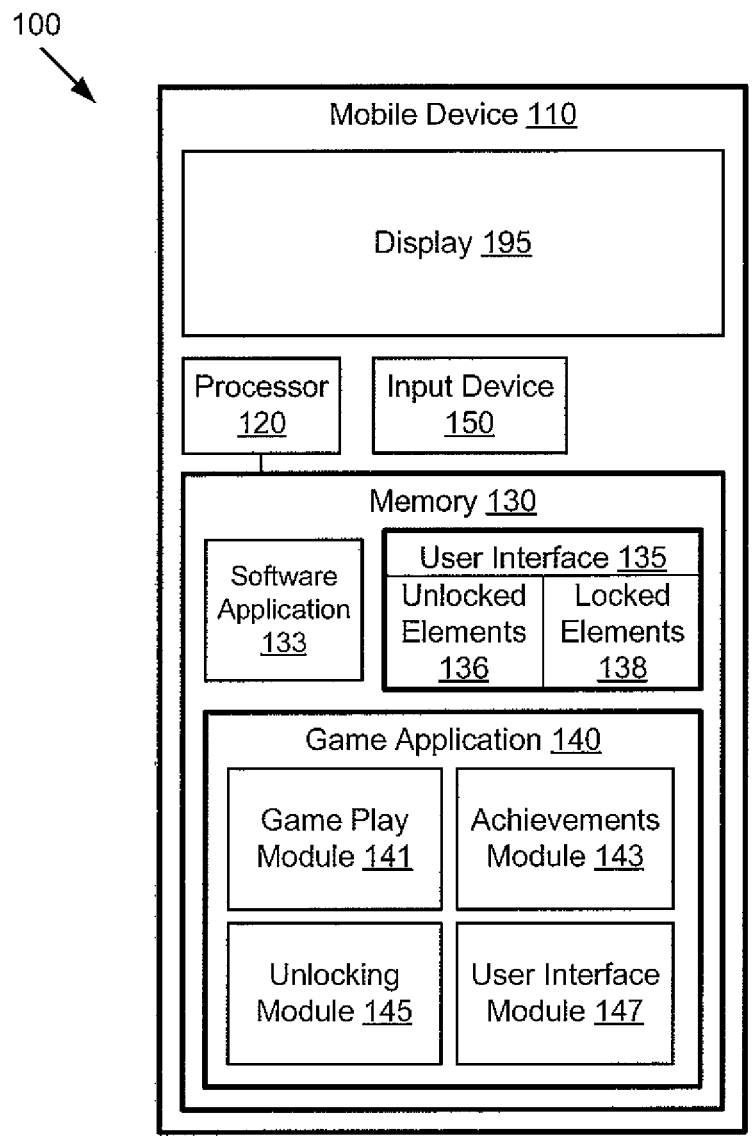
FIG. 1 shows a diagram of an exemplary system for unlocking user interface elements, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for unlocking user interface elements, according to one implementation of the present disclosure. Diagram 100 shows mobile device 110, which includes processor 120, memory 130, input device 150, and display 195. Processor 120 is a hardware processor, such as a central processing unit (CPU) found in computing devices. Memory 130 is a non-transitory storage device for storing software for execution by processor 120, and also for storing various data and parameters. As shown in FIG. 1, memory 130 includes software application 133, user interface 135, and game application 140.

Software application 133 may be an executable code stored in memory 130 for execution by processor 120. In some implementations, software application 133 may be a texting application for drafting and sending messages, such as short message service (SMS) messages, multimedia messaging service (MMS) messages, picture messages, etc. Software application 133 may be an application that is native to mobile device 110, that is, an application that is developed for use on mobile device 110 and installed on mobile device 110 by the original equipment manufacturer. In other implementations, software application 133 may be an application that is downloaded onto mobile device 110. Software application 133 may be downloaded from an application store, a website, etc. In some implementations, software application 133 may include a user interface, such as an extension keyboard, for use with software application 133. In some implementations, software application 133 may represent a plurality of applications stored in memory 130 for execution by processor 120.

User interface 135 may be a native user interface, such as a native keyboard of mobile device 110, or an extension keyboard that is downloaded to mobile device 110 and installed in memory 130. User interface 135 may include a menu for navigating one or more software applications on mobile device 110, such as the home screen of a mobile device, a keyboard for inputting text, such as text for composing a text message, a keyboard for inputting multimedia message, such as a message including a picture and/or an emoji, etc. User interface 135 may include unlocked elements 136 and locked elements 138. Unlocked elements 136 may be elements of user interface 135 that are currently available for use by a user in composing a message. In some implementations, bright and clear keys or icons may represent unlocked elements 136 in user interface 135. Locked elements 138 may be elements of user interface 135 that are currently not available for use by a user in composing a message. In some implementations, grayed-out, partially transparent, or dim keys or icons may represent locked elements 138 in user interface 135.

Game application 140 may include one or more software modules stored in memory 130 for execution by processor 120. As shown in FIG. 1, game application 140 includes game play module 141, achievements module 143, unlocking module 145, and user interface module 147. Game play module 141 is a software module stored in memory 130 for execution by processor 120 to enable a user of mobile device 110 to play a game. In some implementations, the game may include a plurality of game elements arranged in a rectangular game play area, the game play area having a top side that is the side of the game play area furthest from the user, and a bottom side that is the side of the game play area closest to the user. Game play module 141 may receive user input for playing the game. For example, the user may move the game elements to align three or more similar game elements vertically or horizontally. When the user aligns three or more similar game elements, game play module 141 may remove the aligned game elements from the game play area and move the remaining game elements from the top of the game play area towards the bottom of the game play area, filling in empty spaces in the grid of game elements from the top with new game elements. In some implementations, the game elements may correspond to user interface elements and may resemble the user interface elements.

Achievements module 143 is a software module stored in memory 130 for execution by processor 120 to track achievements of a user playing game play module 141. In some implementations, achievements module 143 may track points scored during game play, a play level of the user playing game play module 141, when the user collects of special items during game play, such as item emoji, etc. Achievements module 143 may keep record of a high score earned by the user. In some implementations, achievements module 143 may track achievements earned by the user during game play and exchange of those achievements in the in-game store. For example, achievements module 143 may keep track of a number of coins earned by the user in game play, and may track the balance of coins when the user exchanges coins for an in-game purchase, such as when the user purchases a character emoji in the in-game store.

Unlocking module 145 is a software module stored in memory 130 for execution by processor 120 to unlock game elements in the game. In some implementations, unlocking module 145 may unlock a game element in response to a user input. For example, the user may purchase a game element, such as a character emoji, from an in-game store. The user may earn coins while playing the game of game play module 141 and may exchange the coins for game elements such as character emojis, game bonuses, such as a point bonus to increase the point value earned during game play, a time extension that adds time to a game clock, such as adding five (5) seconds to the game clock, etc. When a user purchases a character emoji from the in-game store, unlocking module 145 may unlock the character for use in game play, and may transmit a signal to user interface module 147 to add a corresponding user interface element to user interface 135. In other implementations, unlocking module 145 may unlock game elements collected by the user during game play, such as item emojis. When a user collects an item emoji, unlocking module 145 may unlock the item emoji in the game and may transmit a signal to user interface module 147 to add a corresponding user interface element to user interface 135.

User interface module 147 is a software module stored in memory 130 for execution by processor 120 to add user interface elements to user interface 135. In some implementations, when unlocking module 145 unlocks a game element, such as an item emoji or a character emoji, user interface module 147 may add a corresponding item emoji or a corresponding character emoji to user interface 135. User interface module 147 may display emojis that are available to unlock, but are not yet unlocked, on user interface 135, such as by showing the locked emojis as user interface elements that are grayed out, or more transparent than user interface elements that have been added to user interface 135. The grayed out or transparent appearance may indicate to the user that the emoji displayed on the locked user interface element is not currently available for use. In some implementations, when a user interface element is unlocked, user interface module 147 may display a flag or icon next to the recently unlock user interface element indicating to the user that the recently unlocked user interface element is new.

Input device 150 is a device for receiving input from a user, and may be incorporated into display 195. Display 195 is a display for showing game play of game play module 141. In some implementations, display 194 may be a touch screen display for receiving input, such as game play input, from a user. User input may include input to play game play module 141, select a menu for purchasing items and/or characters in game application 140, compose a message using user interface 135, etc.

Figure 2:
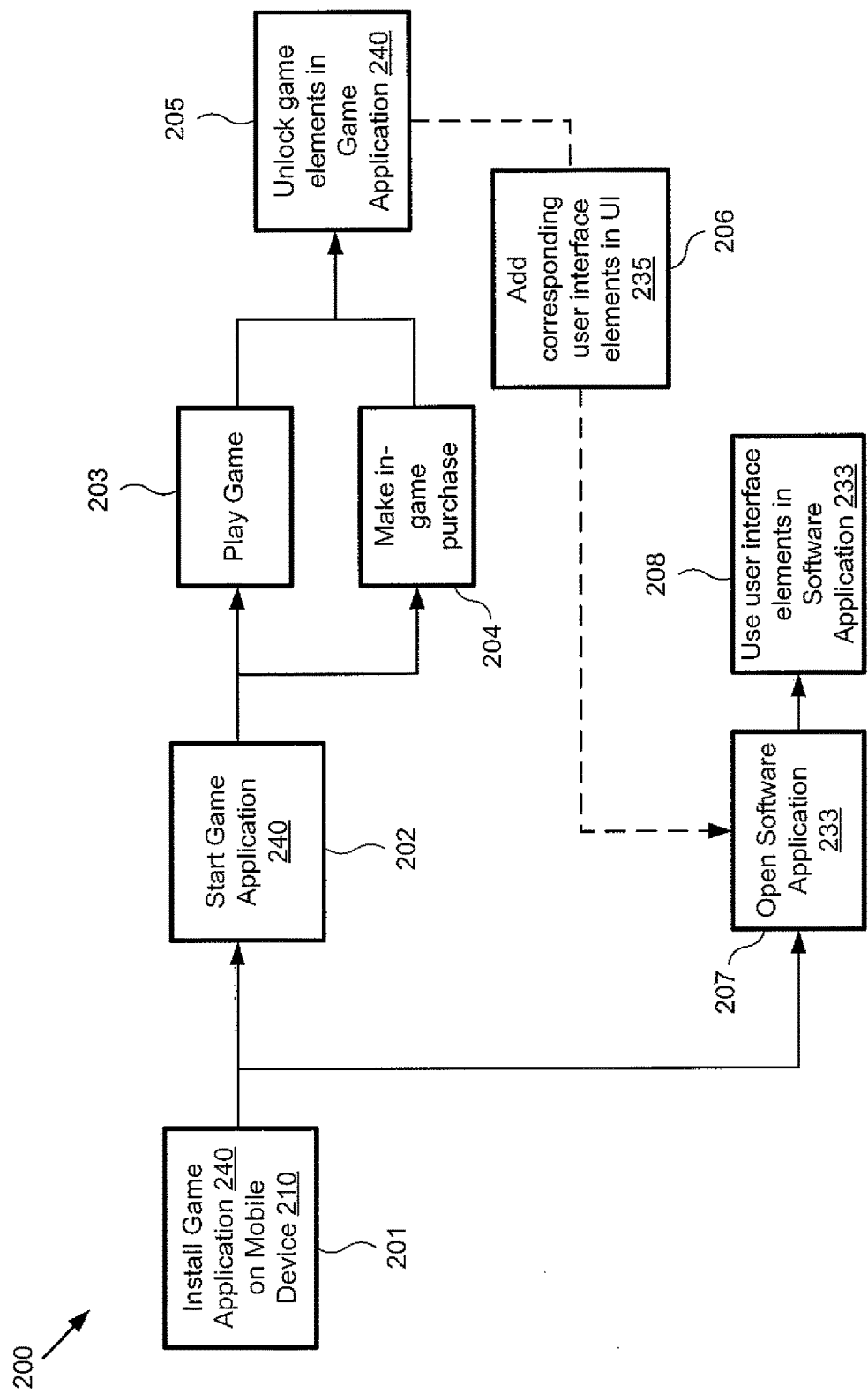
FIG. 2 shows a flowchart illustrating an exemplary use of the system of FIG. 1, according to one implementation of the present disclosure.

FIG. 2 shows a flowchart illustrating an exemplary use of the system of FIG. 1, according to one implementation of the present disclosure. Diagram 200 begins at 201, with the installation of game application 240, corresponding to game application 140, on mobile device 210, corresponding to mobile device 110. In some implementations, game application 240 may include an extension keyboard, such as an emoji keyboard, for use with one or more software applications, such as software application 133. At 202, a user starts game application 240. The user may have various options in game application 240, including an option to play a game and an option to make an in-game purchase. In some implementations, the in-game purchase may allow the user to purchase more lives to play the game, items or abilities to for use in playing the game, characters to use in playing the game, etc.

In a first alternative, at 202, the user plays the game of game application 240. In some implementations, playing the game of game application 240 includes providing user input, for example, using a touch screen interface and/or one or more other input devices. During game play, a user may collect one or more items, such as an object emoji. The user may collect items by directing the item to a certain position in the game such as the bottom of a game play area, navigating to an item and selecting the item, etc. In some implementations, the user may additionally collect a character during game play.

In a second alternative, at 203, the user may select an option to make an in-game purchase. In some implementations, the in-game purchase may involve an in-game currency, such as coins earned during game play, gems earned during game play, etc. In-game purchases may allow a user to purchase additional characters, such as additional characters for use in playing the game. In some implementations, in-game purchases may allow the user to purchase a character without choosing the specific character. For example, the user may use coins earned during game-play to purchase a character box including an unknown character. After the user purchases the character box, the box reveals a character contained therein. In some implementations, certain characters may be available at certain prices; certain characters may be rarer and/or have certain game-play capabilities and thus may cost more to purchase. In some implementations, the user may additionally purchase items using an in-game purchase.

At 205, game elements, such as items and/or characters collected and/or purchased at 203 and 204, are unlocked in game application 240. Once a game element is unlocked, the user may use the unlocked game element in game application 240. At 206, a user interface element corresponding to the unlocked game element is added to user interface 235 of mobile device 210. The user interface elements added to user interface 235 may resemble the item or character that is unlocked in game application 240. At 207, the user opens software application 233. In some implementations, the user may open software application 233 after playing the game of game application 240 and unlocking one or more locked game elements, thus adding the corresponding user interface elements to user interface 235 for use in software application 233. At 208, the user uses one or more added user interface elements in software application 233. For example, software application 233 may be a texting application and may use one or more emojis added to a texting keyboard, such as a native keyboard of mobile device 210 or an extension keyboard stored in memory 130.

Figure 3:
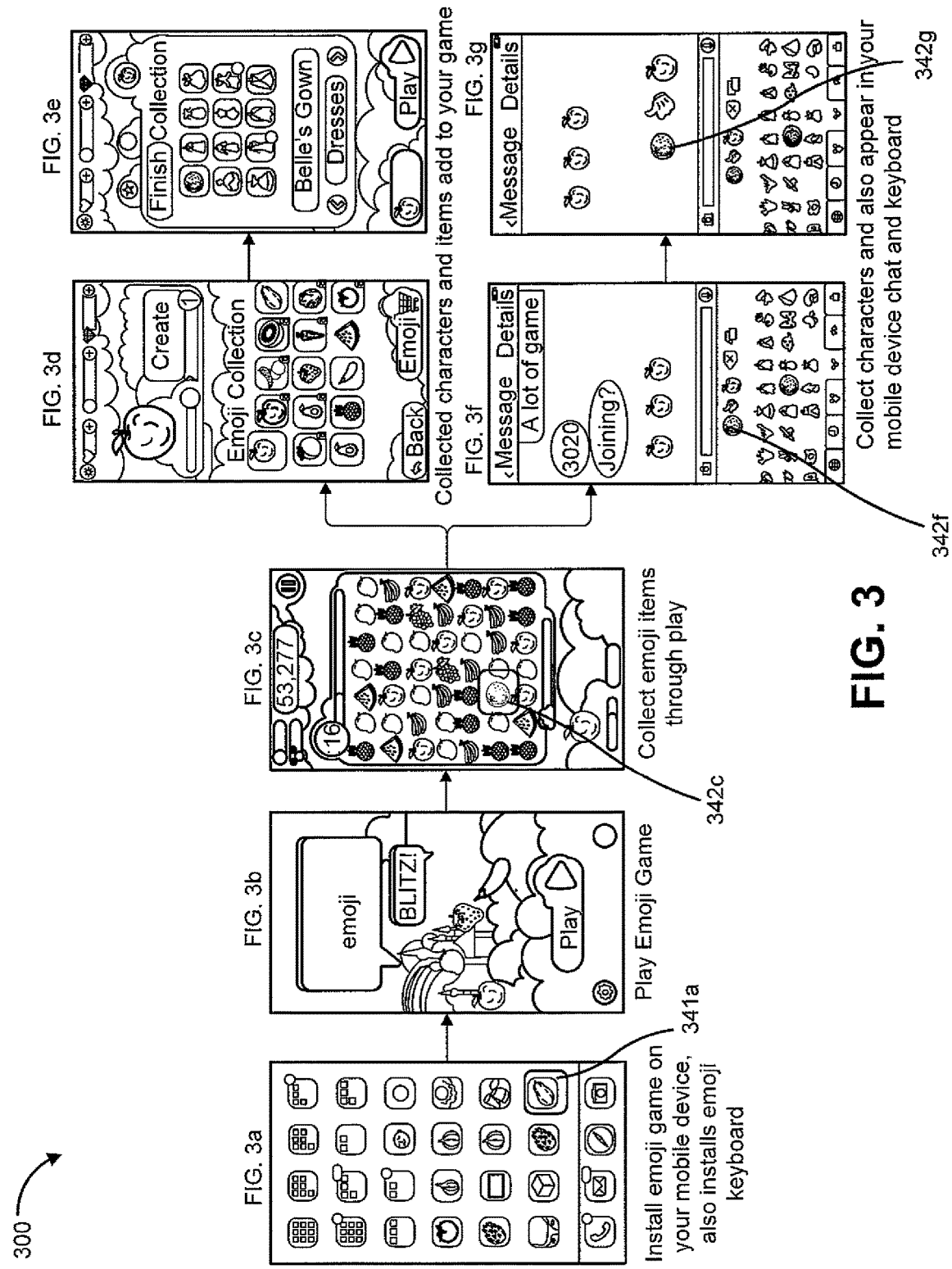
FIG. 3a shows a diagram of an exemplary touch screen display for use with the system of FIG. 1, according to one implementation of the present disclosure.
FIG. 3b shows a diagram of an exemplary display showing a game application, according to one implementation of the present disclosure.
FIG. 3c shows a diagram of an exemplary display showing game play of the game in FIG. 3b, according to one implementation of the present disclosure.
FIG. 3d shows a diagram of an exemplary display showing some character game elements of the game in FIG. 3b, according to one implementation of the present disclosure.
FIG. 3e shows a diagram of an exemplary display showing item game elements of the game in FIG. 3b, according to one implementation of the present disclosure.
FIG. 3f shows a diagram of an exemplary software application using user interface elements corresponding to game elements of FIG. 3d and FIG. 3e, according to one implementation of the present disclosure.
FIG. 3g shows another diagram of the exemplary software application of FIG. 3f, according to one implementation of the present disclosure.

FIG. 3a shows a diagram of an exemplary touch screen display for use with the system of FIG. 1, according to one implementation of the present disclosure. The touch screen display may be a user interface of mobile device 110 and may include a plurality of icons or tiles representing a corresponding plurality of files or applications, such as game icon 341a. In one implementation, the user may select game icon 341a to launch game application 140. FIG. 3b shows a diagram of an exemplary display showing a game application, according to one implementation of the present disclosure. The screen shown in FIG. 3b may be the initial screen displayed when the user launches game play module 141, and may include a button the user may select to play the game of game play module 141.

FIG. 3c shows a diagram of an exemplary display showing game play of the game in FIG. 3b, according to one implementation of the present disclosure. Game play of game play module 141 may include a puzzle game where matching a certain number of game icons together in a row or column removes the game icons from the game play area and causes any game icons above the removed game icons to move closer to the bottom of the game play area. In some implementations, the bottom of the game play area may be a side of the game play area closest to the user as the game play area is displayed on display 195. In some implementations, the game play area may include a plurality of game icons and may additionally include one or more emoji items, such as item 342c. In some implementations, a user may collect an emoji item by causing the emoji item to move to the bottom of the game play area, such as by removing all of the game play icons between the emoji item and the bottom of the game play area in the manner described above. In some implementations, when the user collects one or more emoji items, the emoji item may be unlocked using achievements module 143. Some emoji items may require collection of two or more emoji items during game play to unlock the emoji item.

FIG. 3d shows a diagram of an exemplary display showing some character game elements of the game in FIG. 3b, according to one implementation of the present disclosure. The character emoji collection includes a plurality of unlocked character emojis that are available for the user to use in game play, and a plurality of locked emoji characters that are not yet available for use in game play. To unlock the locked character emojis, the user may make an in-game purchase using coins earned during game play to purchase a character box. FIG. 3e shows a diagram of an exemplary display showing item game elements of the game in FIG. 3b, according to one implementation of the present disclosure. The item emoji collection includes a plurality of unlocked emoji items and a plurality of locked emoji items. The user may unlock each of the locked emoji items by collecting the required number of each locked emoji item during game play.

FIG. 3f shows a diagram of an exemplary software application using user interface elements corresponding to game elements of FIG. 3d and FIG. 3e, according to one implementation of the present disclosure. Software application 133 may include a user interface, such as a keyboard. The keyboard may be a native keyboard on mobile device 110, or the keyboard may be an extension keyboard downloaded to mobile device 110 and installed in memory 130. In some implementations, user interface element 342f may correspond to item 342c, and emoji 342f may be added to the keyboard of software application 133 when the user unlocks item 342c in game play module 141. As shown in FIG. 3f, the user may select emoji 342f to be included in a text message. FIG. 3g shows another diagram of the exemplary software application of FIG. 3f, according to one implementation of the present disclosure. After drafting a text message to send using software application 133, emoji 342g may be sent as part of a message. In some implementations, emoji 342g may be transmitted as a picture within a message, such as a multimedia message.

Figure 4:
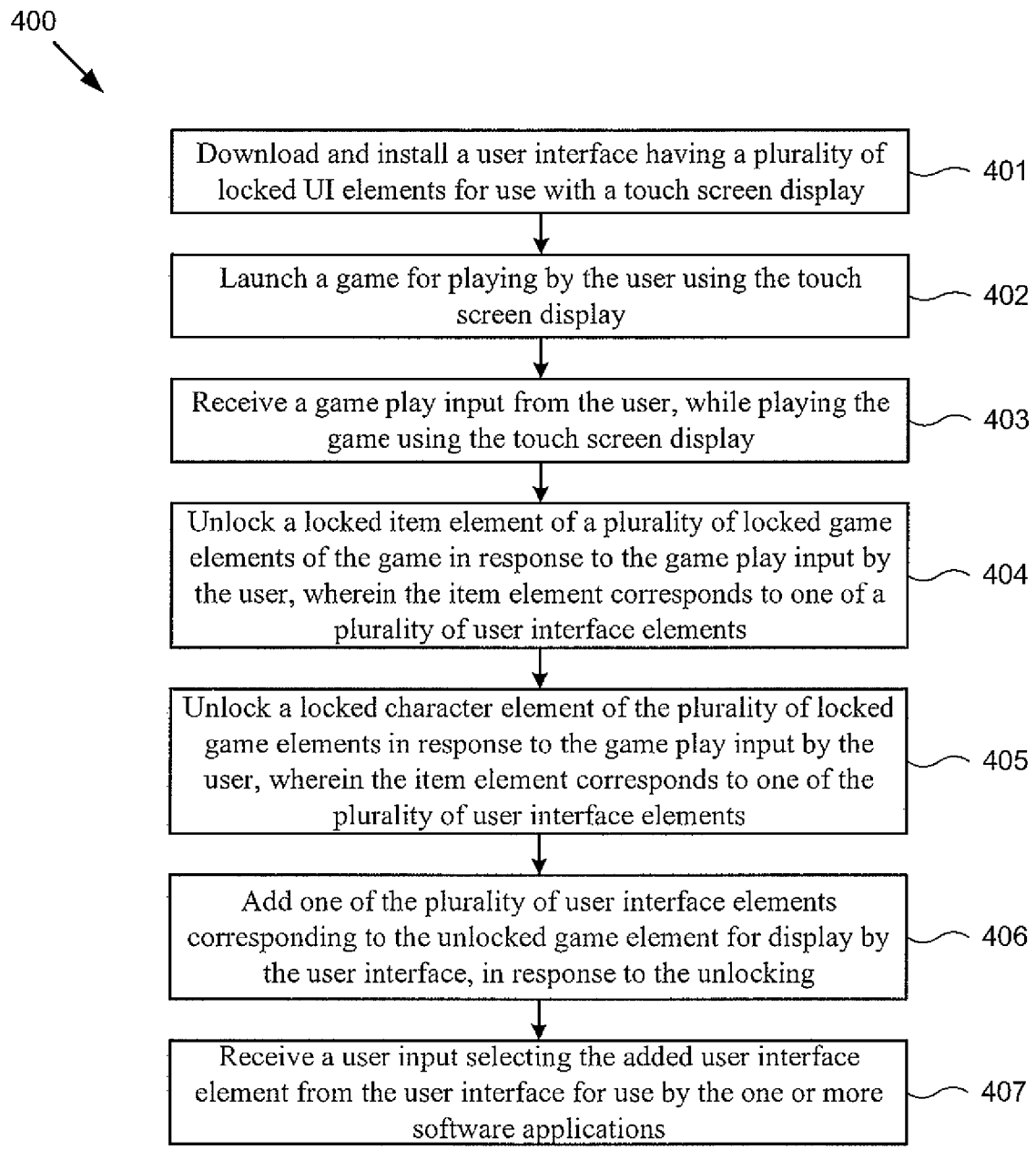
FIG. 4 shows a flowchart illustrating an exemplary method of unlocking user interface elements, according to one implementation of the present disclosure.

FIG. 4 shows a flowchart illustrating an exemplary method of unlocking user interface elements, according to one implementation of the present disclosure. Method 400 begins at 401, where a user optionally downloads and installs user interface 135, including locked elements 138, for use with software application 133. In other implementations, user interface 135 may be a native user interface and may be installed in memory 130 by the original equipment manufacturer of mobile device 110. User interface 135 may include a keyboard including a plurality of user interface elements. Each user interface element may represent a character, mark, icon, emoji, etc., for use by the user. For example, user interface 135 may include a plurality of emojis, such as a plurality of item emojis each looking like an item, and/or a plurality of character emojis each looking like a character, such as a character from television show, a character from a movie, etc. User interface 135 may include unlocked elements 136 that are user interface elements available for current use by a user. User interface 135 may include locked elements 138 that are user interface elements not currently available for user by a user. In some implementations, locked elements 138 may appear on user interface 135, but may differ in appearance from unlocked elements 136, such as by being grayed-out, more transparent, appearing more dim, etc.

At 402, game application 140 launches a game for playing by the user using display 195. In some implementations, a user may select a game to play using user interface 135, and game play module 141 may launch the game. The game may include a game play function, an in-game store for purchasing game elements, such as character emoji for use in game play, an item emoji for use in game play, etc. At 403, game application 140 receives a game play input from the user, while playing the game using the display 195. In one implementation, the game play input may include a user input for controlling the game and earning achievements in game play module 141. In one implementation, game play input may include selecting an option in the in-game store for purchasing a game element.

At 404, game application 140 unlocks a locked item element of a plurality of locked game elements of the game in response to the game play input by the user, wherein the item element corresponds to and may resemble one of a plurality of user interface elements. In some implementations, game play may include collecting one or more items, such as one or more item emojis. In one implementation, one or more item emojis may appear in a game play area, and may be intermixed with other game elements. In order to collect the item emoji, the user may be required to cause the one or more item emojis to move to a particular area of the game, such as causing the one or more item emojis to move to the bottom of a game play area. For example, the game may include a grid of game elements, where each game element is an icon. By switching the positions of vertically adjacent game elements or horizontally adjacent game elements, the user may cause the alignment of three or more game elements of the same type. When such an alignment occurs, game play module 141 may remove the three or more game elements of the same type from the game play area.

In some implementations, removal of the three or more game elements of the same type may earn points for the user, coins for the user, increased time for the user, or other in-game rewards for the user. Game play module 141 may move other game elements into the grid positions vacated by the removed game elements. In some implementations, game elements may move from a top of the game play area, which may be the edge of the game play area furthest from the user on display 195, towards the bottom of the game play area, which may be the edge of the game play area closest to the user on display 195. Such a game play arrangement may make it appear to the user that game elements are "falling" towards the user during game play. When an item emoji reaches the bottom of the game play area, the item emoji may be collected by the user and may be unlocked in the game.

At 405, game application 140 unlocks a locked character element of the plurality of locked game elements in response to the game play input by the user, wherein the item element corresponds to and may resemble one of the plurality of user interface elements. In some implementations, a locked character may be unlocked during game play, in a manner similar to unlocking an item emoji, or the character emoji may be unlocked by a purchase in an in-game store. In one implementation, the user may select a store or emoji shop from a game menu, such as on the initial screen displayed when the game loads. The user may use in-game currency, such as coins earned by playing the game, gems earned by playing the game, or other in-game currency earned by during game play. In other implementations, a user may purchase in-game currency using real money. For example, the user may purchase coins in exchange for money deducted from a bank account, credit card, etc. In some implementations, the in-game currency transaction may be facilitated through an app store.

In one implementation, the user may purchase a character box from the in-game store. The character box may include an unknown character, the identity of which is revealed after the character box is purchased. In some implementations, unlocking module 145 may track which characters are already unlocked in the game, and the character box will reveal a character that the user has not previously unlocked, thereby increasing the number of unlocked characters with each character box purchased. In other implementations, the character revealed by the character box may be selected at random and may duplicate a character previously unlocked by the user. In such an implementation, one or more character emojis may be less common than other character emojis to create a perceived value and encourage users to purchase character boxes in an attempt to unlock all of the character emojis. In other implementations, the in-game store may include a plurality of character boxes with different prices. More expensive character boxes may contain character emojis that are rarer and/or character emojis that are restricted to higher levels of game play. When the user purchases a character box and the character is revealed, the character may be unlocked for use in game play.

At 406, game application 140 adds one of the plurality of user interface elements corresponding to the unlocked game element for display by the user interface, in response to the unlocking. In some implementations, when unlocking module unlocks a game element, such as an item emoji or a character emoji, user interface module 147 may add a corresponding user interface element to user interface 135. In some implementations, adding the user interface element may include unlocking a previously locked user interface element, such as by making a previously unselectable user interface element selectable. The added user interface element may be represented in user interface 135 by a key on a keyboard, such as a native keyboard or an extension keyboard. The added user interface element may resemble the unlocked game element. For example, the added user interface element may be a key on a keyboard identified by a picture of the unlocked game element. Adding the user interface element to user interface 135 may make the added user interface element selectable for use in composing messages, such as text messages, MMS messages, picture messages, etc.

At 407, software application 133 receives a user input selecting the added user interface element from the user interface for use by software application 133. In some implementations, the user input may select the added user interface element to be included in a text message, an MMS message, a picture message, etc. Software application 133 may insert the emoji represented by the unlocked user interface element into the message and transmit the message.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a display;
   a non-transitory memory storing a user interface keyboard, one or more software applications, and a game application; and
   a hardware processor executing the game application to:
      launch a game for playing by a user using the display;
      receive a game play input from the user, while playing the game using the display;
      unlock a locked game element of a plurality of locked game elements of the game, in response to the game play input by the user, wherein each of the plurality of locked game elements corresponds to one of a plurality of user interface elements; and
      modify the user interface keyboard to add one of the plurality of user interface elements corresponding to the unlocked game element to the user interface keyboard, in response to the unlocking;
      wherein the user interface keyboard, including the one of the plurality of user interface elements corresponding to the unlocked game element, is used by the one or more software applications, and wherein the hardware processor when executing the one or more software applications displays, on the display, the user interface keyboard including the one of the plurality of user interface elements added to the user interface.

2. The system of claim 1, wherein the game play input includes one of an action during game play and a selection from a game menu.

3. The system of claim 1, wherein, after adding the one of the plurality of user interface elements to the user interface keyboard for display by the user interface keyboard, the user interface keyboard displays an icon indicating a recently added user interface element.

4. The system of claim 1, wherein the locked game element is one of a character emoji and an object emoji.

5. The system of claim 1, wherein the user further provides an in-game purchase.

6. The system of claim 5, wherein the in-game purchase is a game-currency purchase.

7. The system of claim 1, wherein the user interface keyboard is one of a native keyboard and an extension keyboard.

8. The system of claim 1, wherein the one of the plurality of user interface elements is added to the user interface keyboard for a period of time.

9. The system of claim 8, wherein the temporary adding of the user interface element may be extended based on further game play input by the user.

10. The system of claim 1, wherein the one of the plurality of user interface elements is added to the user interface keyboard for a number of uses.

11. A method for use with a system including a display, a non-transitory memory, and a hardware processor, the method comprising:
  launching, using the hardware processor, a game for playing by a user using the display;
  receiving, using the hardware processor, a game play input from the user, while playing the game using the display;
  unlocking, using the hardware processor, a locked game element of a plurality of locked game elements of the game, in response to the game play input by the user, wherein each of the plurality of locked game elements corresponds to one of a plurality of user interface elements; and
  modify the user interface keyboard to add, using the hardware processor, one of the plurality of user interface elements corresponding to the unlocked game element to the user interface keyboard, in response to the unlocking;
  wherein the user interface keyboard, including the one of the plurality of user interface elements corresponding to the unlocked game element, is used by one or more software applications, and the method further comprises executing the one or more software applications, using the hardware processor, to display, on the display, the user interface keyboard including the one of the plurality of user interface elements added to the user interface.

12. The method of claim 11, wherein the game play input includes one of an action during game play and a selection from a game menu.

13. The method of claim 11, wherein, after adding the one of the plurality of user interface elements to the user interface keyboard for display by the user interface keyboard, the user interface keyboard displays an icon indicating a recently added user interface element.

14. The method of claim 11, wherein the locked game element is one of a character emoji and an object emoji.

15. The method of claim 11, wherein the user further provides an in-game purchase.

16. The method of claim 15, wherein the in-game purchase is a game-currency purchase.

17. The method of claim 11, wherein the user interface keyboard is one of a native keyboard and an extension keyboard.

18. The method of claim 11, wherein the one of the plurality of user interface elements is added to the user interface keyboard for a period of time.

19. The method of claim 18, wherein the temporary adding of the user interface element may be extended based on further game play input by the user.

20. The method of claim 11, wherein the one of the plurality of user interface elements is added to the user interface keyboard for a number of uses.

* * * * *